US009637403B2

(12) United States Patent
McKay et al.

(10) Patent No.: US 9,637,403 B2
(45) Date of Patent: May 2, 2017

(54) SLUDGE TREATMENT METHOD

(71) Applicant: Wetox Limited, Wellington (NZ)

(72) Inventors: Kevin Joseph McKay, Wellington (NZ); Thomas Borrmann, Wellington (NZ)

(73) Assignee: Wetox Limited, Wellington (NZ)

( * ) Notice: Subject to any disclaimer, the term of this patent is extended or adjusted under 35 U.S.C. 154(b) by 55 days.

(21) Appl. No.: 14/402,647

(22) PCT Filed: May 23, 2013

(86) PCT No.: PCT/IB2013/054257
§ 371 (c)(1),
(2) Date: Nov. 20, 2014

(87) PCT Pub. No.: WO2013/175423
PCT Pub. Date: Nov. 28, 2013

(65) Prior Publication Data
US 2015/0151999 A1 Jun. 4, 2015

(30) Foreign Application Priority Data

May 23, 2012 (NZ) ........................................ 600168

(51) Int. Cl.
*C02F 1/02* (2006.01)
*C02F 1/52* (2006.01)
(Continued)

(52) U.S. Cl.
CPC ............... *C02F 11/08* (2013.01); *C02F 1/02* (2013.01); *C02F 1/5245* (2013.01); *C02F 1/66* (2013.01);
(Continued)

(58) Field of Classification Search
CPC .. C01F 1/52; C01F 1/5254; C01F 1/66; C01F 1/72; C01F 1/725; C01F 1/02;
(Continued)

(56) References Cited

U.S. PATENT DOCUMENTS 3,377,272 A    4/1968  Cann
3,901,804 A *  8/1975  Ohuchi .................. C02F 11/08
                                                       210/711

(Continued)

FOREIGN PATENT DOCUMENTS

CN     102372391 A    3/2012
EP       0723937 A2   7/1996
(Continued)

OTHER PUBLICATIONS

International Preliminary Report on Patentability (Chapter II of the Patent Cooperation Treaty (Sep. 23, 2014), 7 pages, USPTO.

(Continued)

*Primary Examiner* — Lucas Stelling
(74) *Attorney, Agent, or Firm* — Moss & Barnett; Michael A. Bondi

(57) ABSTRACT

The present invention relates to the treatment of sludge and, more particularly, to a method for recovering phosphate as a substantially solid component from a phosphate-containing sludge. Some embodiments of the invention relate to a method for recovering phosphate as a substantially solid component and aluminum as a liquid component from a phosphate-containing and aluminum-containing sludge. The method incorporates wet oxidation to decompose the organic components of the sludge to provide a residual sludge. The residual sludge comprises the insoluble components and, in some embodiments wherein the sludge comprises aluminum, the residual sludge further comprises suspended and/or soluble aluminum.

22 Claims, 3 Drawing Sheets

(51) Int. Cl.
*C02F 1/66* (2006.01)
*C02F 1/72* (2006.01)
*C02F 1/74* (2006.01)
*C02F 11/08* (2006.01)
*C02F 101/10* (2006.01)

(52) U.S. Cl.
CPC .................. *C02F 1/74* (2013.01); *C02F 1/72* (2013.01); *C02F 2101/105* (2013.01)

(58) Field of Classification Search
CPC .......... C01F 1/025; C01F 1/5245; C01F 1/74; C02F 11/08; C02F 11/086; C02F 2101/105; C02F 2103/16; C02F 2209/06; C02F 2303/08
See application file for complete search history.

(56) References Cited

U.S. PATENT DOCUMENTS

| | | |
|---|---|---|
| 4,100,070 A | 7/1978 | White |
| 5,252,224 A | 10/1993 | Modell |
| 5,720,882 A | 2/1998 | Stendahl |
| 6,238,568 B1 | 5/2001 | Hazlebeck |
| 2004/0232088 A1 | 11/2004 | Stenmark |
| 2007/0062233 A1 | 3/2007 | Burnham |
| 2010/0133196 A1 | 6/2010 | Khudenko |

FOREIGN PATENT DOCUMENTS

| | | |
|---|---|---|
| EP | 0723938 A2 | 7/1996 |
| EP | 1550638 A1 | 6/2005 |
| GB | 2043045 A | 10/1980 |
| JP | 06091281 | 4/1994 |
| JP | 10137780 | 5/1998 |
| JP | 2003200199 | 7/2003 |
| JP | 2005246215 | 9/2005 |
| JP | 2007283223 | 11/2007 |
| WO | 04000423 | 12/2003 |

OTHER PUBLICATIONS

Banu, R.J. et al., Phosphorus removal in low alkalinity secondary effluent using alum, Int. J. Environ. Sci. Tech., 5 (1), 93-98, Winter 2008.
EP 13794946.6—EPO extended European search report mailed Oct. 7, 2015, 5 pages.
Masaaki Takahashi, Susumu Kato, Seiji Iwasaki and Keiichi Miura 'Technology for recovering phosphorus salt and zeolite from incinerated ash of sewage treatment sludge'. Journal of Advanced Science vol. 13, No. 3 (2001) 163-166.
Investigation of phosphorus desorption from P-saturated alum sludge used as a substrate in constructed wetland: X. H. Zhao and Y. Q. Zhao; 2009, Separation and Purification Technology (66) 71-75.
Harris, 'Wetox now has foot in UK as it bids for global clients'. The Dominion Post, Feb. 27, 2012, 1 page.
Possibilities for phosphorus recovery from sewage sludge ask C. Schaum, P. Cornel and N. Jardin; 2005, Management of Residues Emanating from Water and Wastewater Treatment, Aug. 9-12, 2005, Johannesburg, South Africa.
Recovery of coagulant from water supply plant sludge and its effect on clarification: S. Ishikawa, N. Ueda, Y. Okumura, Y. Iida and K. Baba; 2007, J. Material Cycles Waste Management (9) 167-172.
Recycle of alum recovered from water treatment sludge in chemically enhanced primary treatment. G. R. Xu, Z. C. Yan, Y. C. Wang, N. Wang; 2009, Journal of Hazardous Materials (161) 663-669.
Pages from www.wetox.co.nz, Feb. 21, 2012.
NZ 610993—Intellectual Property Office of New Zealand examination report issued May 29, 2013, 2 pages.
Rose, Paul M; McKay, Kevin J; Tallon, Stephen J; Catchpole, Owen J; Mollenhauer, Thomas; Source: In: Chemeca 2012: Quality of life through chemical engineering: Sep. 23-26, 2012, Wellington, New Zealand. Barton, A.C.T.: Engineers Australia, 2012: [953]-[960]. Document Type: Conference Paper EISBN: 9781922107596.

\* cited by examiner

SLUDGE TREATMENT METHOD

FIELD OF THE INVENTION

The present invention relates to the treatment of sludge and, more particularly, to a method for the recovery of phosphate and, optionally, aluminium from sludge.

BACKGROUND

Phosphorus present in domestic wastewater from the use of laundry and dishwasher powders as well as human waste is an important macro-nutrient for plant and micro-organism growth. The discharge of large quantities of phosphorus into natural receiving sources produces the growth of algae and results in eutrophication of lakes and streams. Algae may grow at levels as low as 0.05 mg/L orthophosphate ($PO_4^{3-}$).

The phosphorus concentration in effluent discharging from a wastewater treatment plant (WWTP) is usually within the range of 3-7 mg/L, which substantially comprises orthophosphate ("Phosphorus removal in low alkalinity secondary effluent using alum" R. J. Banu; K. U. Do; I. T. Yeom *Int. J. Environ. Sci. Tech.* 5 (1), 93-98, 2008, which is incorporated herein in its entirety by reference). It is often necessary to reduce the concentration of phosphorus in secondary wastewater to prevent algal blooms. Accordingly, consent by regulatory authorities to discharge effluent into a water environment usually requires a limit on the concentration of phosphate.

Aluminium salts, which are used as a coagulant in water and wastewater treatment plants, also precipitate phosphate as aluminium phosphate from the treated water prior to discharge. Chemical removal of phosphorus by the addition of an aluminium salt to precipitate the corresponding phosphate salt is one of the most reliable and well-established processes practiced by a WWTP.

The resulting waste sludge separated from the treated water contains high levels of organic material as well as the insoluble aluminium phosphate and other inorganic salts, such as aluminium hydroxide.

Known methods for recovering aluminium and phosphate from sludge for reuse generally employ acid extraction techniques using sulfuric acid, for example. These processes are, however, non-selective and can lead to excess contamination of the recovered aluminium compounds. Other techniques that have been employed include ion exchange and ion selective membranes.

Accordingly, it is an object of the present invention to go some way to avoiding the above disadvantages; and/or to at least provide the public with a useful choice.

Other objects of the invention may become apparent from the following description which is given by way of example only.

BRIEF DESCRIPTION OF THE INVENTION

In a first aspect, the present invention provides a method for treating a sludge, the method comprising subjecting a phosphate-containing and calcium-containing sludge to wet oxidation such that the pH of the residual sludge obtained after wet oxidation is at least about 8.

In a second aspect, the present invention provides a method for treating a sludge, the method comprising subjecting a phosphate-containing sludge comprising added calcium ions to wet oxidation at a pH of at least about 8.

In a third aspect, the present invention provides a method for treating a sludge, the method comprising:
(a) adding calcium ions to a phosphate-containing sludge;
(b) if the pH of the sludge is less than about 8, adjusting the pH of the sludge to at least about 8; and
(c) subjecting the sludge with added calcium ions and a pH of at least about 8 to wet oxidation.

In a fourth aspect, the present invention provides a method for treating a sludge, the method comprising:
(a) adding calcium ions to a phosphate-containing sludge;
(b) if the pH of the sludge is less than about 8, adjusting the pH of the sludge to at least about 8; and
(c) subjecting the sludge with added calcium ions and a pH of at least about 8 to wet oxidation in a reactor.

In a fifth aspect, the present invention provides a method for treating a sludge, the method comprising subjecting a phosphate-containing, calcium-containing, and aluminium-containing sludge to wet oxidation such that the pH of the residual sludge obtained after wet oxidation is at least about 8.

In a sixth aspect, the present invention provides a method for treating a sludge, the method comprising subjecting a phosphate-containing and aluminium-containing sludge comprising added calcium ions to wet oxidation at a pH of at least about 8.

In a seventh aspect, the present invention provides a method for treating a sludge, the method comprising:
(a) adding calcium ions to a phosphate-containing and aluminium-containing sludge;
(b) if the pH of the sludge is less than about 8, adjusting the pH of the sludge to at least about 8; and
(c) subjecting the sludge with added calcium ions and a pH of at least about 8 to wet oxidation.

In an eighth aspect, the present invention provides a method for treating a sludge, the method comprising:
(a) adding calcium ions to a phosphate-containing and aluminium-containing sludge;
(b) if the pH of the sludge is less than about 8, adjusting the pH of the sludge to at least about 8; and
(c) subjecting the sludge with added calcium ions and a pH of at least about 8 to wet oxidation in a reactor.

As used herein, unless the context clearly dictates otherwise, the singular forms "a," "an," and "the" include the plural form, and the letter "s" following a noun designates both the plural and singular forms of that noun.

As used herein the term "and/or" means "and" or "or" or both.

The term "comprising" as used in this specification means "consisting at least in part of". When interpreting statements in this specification which include that term, the features, prefaced by that term in each statement or claim, all need to be present but other features can also be present. Related terms such as "comprise" and "comprised" are to be interpreted in the same manner.

It is intended that reference to a range of numbers disclosed herein (for example, 1 to 10) also incorporates reference to all rational numbers within that range (for example, 1, 1.1, 2, 3, 3.9, 4, 5, 6, 6.5, 7, 8, 9, and 10) and also any range of rational numbers within that range (for example, 2 to 8, 1.5 to 5.5, and 3.1 to 4.7) and, therefore, all sub-ranges of all ranges expressly disclosed herein are hereby expressly disclosed. These are only examples of what is specifically intended and all possible combinations of numerical values between the lowest value and the highest value enumerated are to be considered to be expressly stated in this application in a similar manner.

In this specification where reference has been made to patent specifications, other external documents, or other sources of information, this is generally for the purpose of providing a context for discussing the features of the invention. Unless specifically stated otherwise, reference to such external documents is not to be construed as an admission that such documents, or such sources of information, in any jurisdiction, are prior art, or form part of the common general knowledge in the art.

BRIEF DESCRIPTION OF THE DRAWINGS

The invention will now be described by way of example with reference to the Figures in which.

DETAILED DESCRIPTION OF THE INVENTION

Figure 1:
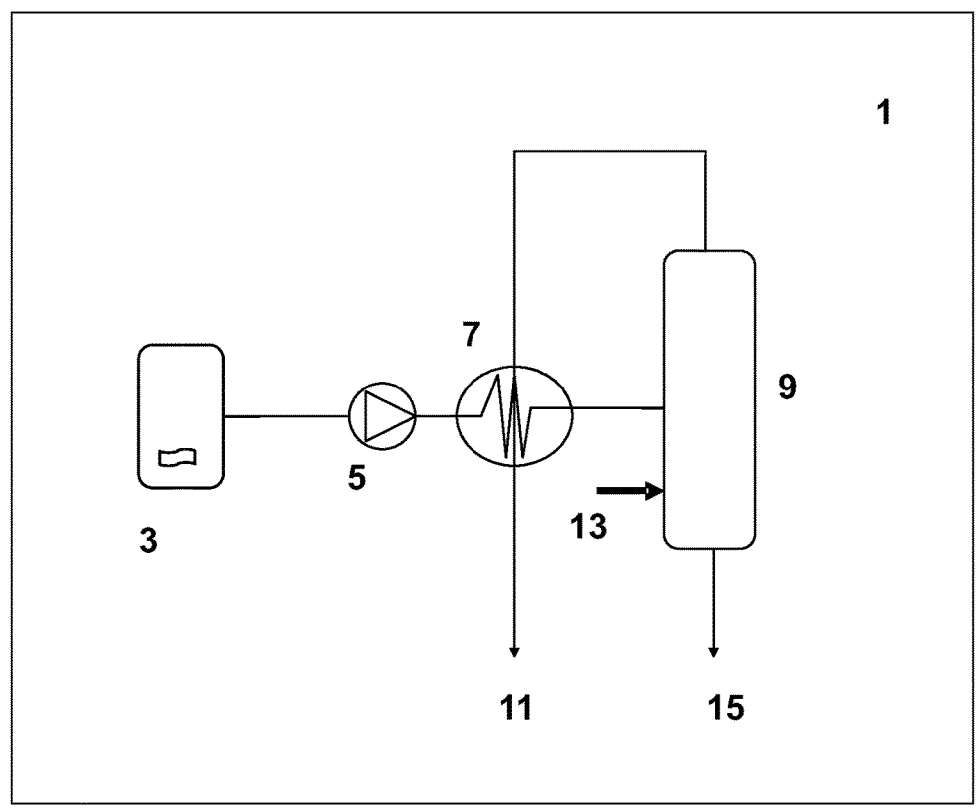
FIG. 1 is a schematic diagram of one embodiment of an apparatus suitable for use in a method of the invention.

In a first aspect, the present invention provides a method for treating a sludge, the method comprising subjecting a phosphate-containing and calcium-containing sludge to wet oxidation such that the pH of the residual sludge obtained after wet oxidation is at least about 8.

In some embodiments, the present invention provides a method for treating a sludge, the method comprising subjecting a phosphate-containing sludge comprising added calcium ions to wet oxidation such that the pH of the residual sludge obtained after wet oxidation is at least about 8.

In a second aspect, the present invention provides a method for treating a sludge, the method comprising subjecting a phosphate-containing sludge comprising added calcium ions to wet oxidation at a pH of at least about 8.

In a third aspect, the present invention provides a method for treating a sludge, the method comprising:
(a) adding calcium ions to a phosphate-containing sludge;
(b) if the pH of the sludge is less than about 8, adjusting the pH of the sludge to at least about 8; and
(c) subjecting the sludge with added calcium ions and a pH of at least about 8 to wet oxidation.

In a fourth aspect, the present invention provides a method for treating a sludge, the method comprising:
(a) adding calcium ions to a phosphate-containing sludge;
(b) if the pH of the sludge is less than about 8, adjusting the pH of the sludge to at least about 8; and
(c) subjecting the sludge with added calcium ions and a pH of at least about 8 to wet oxidation in a reactor.

The term "sludge" is a generic term for solids separated from suspension in a liquid. Sludge usually contains significant quantities of 'interstitial' water (between the solid particles). In addition to phosphate, the sludge used in the method of the present invention also comprises organic material. In some embodiments, the phosphate-containing sludge is the residual, semi-solid material that results from industrial wastewater, or sewage treatment processes. The settled suspension obtained from conventional drinking water treatment and numerous other industrial processes is also suitable for use as the phosphate-containing sludge in the method of the invention. The invention also contemplates the use of other phosphate-containing sludge that comprises organic matter, such as food processing waste and yeast waste.

In some embodiments, the sludge is obtained from the treatment of water or waste water with an aluminium compound. Suitable aluminium compounds include, but are not limited to, aluminium sulfate (alum), aluminium chloride, sodium aluminate, aluminium chlorohydrate, aluminium hydroxide, aluminium nitrate, aluminium acetate, polyaluminium chloride, and other water-soluble or water-miscible aluminium compounds.

In such water or waste water treatment, the soluble aluminium compound reacts with phosphate to form a precipitate of aluminium phosphate:

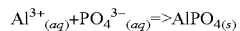

$$Al^{3+}{}_{(aq)} + PO_4^{3-}{}_{(aq)} => AlPO_{4(s)}$$

The stoichiometric mole ratio for this precipitation reaction is 1:1 $Al^{3+}:PO_4^{3-}$. The mole ratio typically employed is, however, about 2.3:1 due to competing reactions and coagulation effects.

In some embodiments, the solids content of the sludge is between about 1% and about 7%. The invention is not, however, limited thereto and sludge with a solids content outside this range may also be used. In some embodiments, the solids content of the sludge is between about 2% and about 7%. In some embodiments, the solids content of the sludge is between about 1% and about 4.5%.

Those persons skilled in the art will appreciate that there is a chemical oxygen demand (COD) value for the sludge, above which the heat produced by the wet oxidation reaction will be sufficient to sustain the reaction. This COD value will depend on the conditions under which the wet oxidation is performed.

In some embodiments, the sludge has a COD of at least about 40 g/L. The invention is not, however, limited thereto and sludge with a COD below this value may also be used. In some embodiments, the sludge has a COD of between about 40 g/L and about 70 g/L. In some embodiments, the sludge has a COD of about 60 g/L or less. In some embodiments, the sludge has a COD of between about 40 g/L and about 60 g/L.

In some embodiments, the phosphate content of the sludge is between about 0.5 g/L and about 1.5 g/L. The invention is not, however, limited thereto and sludge with a phosphate content outside this range may also be used. In some embodiments, the phosphate content of the sludge is between about 0.6 g/L and about 1.1 g/L. In some embodiments, the phosphate content of the sludge is about 0.7 g/L. In some embodiments, the phosphate content of the sludge is about 1 g/L.

In some embodiments, the aluminium content of the sludge is between about 0.5 g/L and about 1.5 g/L. The invention is not, however, limited thereto and sludge with an aluminium content outside this range may also be used. In some embodiments, the aluminium content of the sludge is between about 0.6 g/L and about 1.1 g/L. In some embodiments, the aluminium content of the sludge is about 0.7 g/L. In some embodiments, the aluminium content of the sludge is about 1 g/L.

In a fifth aspect, the present invention provides a method for treating a sludge, the method comprising subjecting a phosphate-containing, calcium-containing, and aluminium-containing sludge comprising calcium ions to wet oxidation such that the pH of the residual sludge obtained after wet oxidation is at least about 8.

In some embodiments, the present invention provides a method for treating a sludge, the method comprising subjecting a phosphate-containing and aluminium-containing sludge comprising added calcium ions to wet oxidation such that the pH of the residual sludge obtained after wet oxidation is at least about 8.

In a sixth aspect, the present invention provides a method for treating a sludge, the method comprising subjecting a phosphate-containing and aluminium-containing sludge comprising added calcium ions to wet oxidation at a pH of at least about 8.

In a seventh aspect, the present invention provides a method for treating a sludge, the method comprising:
(a) adding calcium ions to a phosphate-containing and aluminium-containing sludge;
(b) if the pH of the sludge is less than about 8, adjusting the pH of the sludge to at least about 8; and
(c) subjecting the sludge with added calcium ions and a pH of at least about 8 to wet oxidation.

In an eighth aspect, the present invention provides a method for treating a sludge, the method comprising:
(a) adding calcium ions to a phosphate-containing and aluminium-containing sludge;
(b) if the pH of the sludge is less than about 8, adjusting the pH of the sludge to at least about 8; and
(c) subjecting the sludge with added calcium ions and a pH of at least about 8 to wet oxidation in a reactor.

In some embodiments, steps (a) and (b) may be performed in any order. The pH of the sludge may be adjusted and then calcium ions added or, alternatively, the calcium ions may be added and then the pH adjusted. In some embodiments, adding calcium ions results in the sludge having a pH of at least about 8 without further pH adjustment. The invention also contemplates embodiments in which the pH of the sludge is at least about 8 before calcium ions are added, and no further pH adjustment is necessary. In some embodiments, calcium ions are added and the pH is adjusted simultaneously.

In some embodiments, the present invention provides a method for treating a sludge, the method comprising:
(a) adding calcium ions to a phosphate-containing sludge;
(b) if the pH of the sludge with added calcium ions is less than about 8, adjusting the pH of the sludge to at least about 8; and
(c) subjecting the sludge with added calcium ions and a pH of at least about 8 to wet oxidation.

In some embodiments, the present invention provides a method for treating a sludge, the method comprising:
(a) adding calcium ions to a phosphate-containing sludge;
(b) if the pH of the sludge with added calcium ions is less than about 8, adjusting the pH of the sludge to at least about 8; and
(c) subjecting the sludge with added calcium ions and a pH of at least about 8 to wet oxidation in a reactor.

In some embodiments, the present invention provides a method for treating a sludge, the method comprising:
(a) adding calcium ions to a phosphate-containing and aluminium-containing sludge;
(b) if the pH of the sludge with added calcium ions is less than about 8, adjusting the pH of the sludge to at least about 8; and
(c) subjecting the sludge with added calcium ions and a pH of at least about 8 to wet oxidation.

In some embodiments, the present invention provides a method for treating a sludge, the method comprising:
(a) adding calcium ions to a phosphate-containing and aluminium-containing sludge;
(b) if the pH of the sludge with added calcium ions is less than about 8, adjusting the pH of the sludge to at least about 8; and
(c) subjecting the sludge with added calcium ions and a pH of at least about 8 to wet oxidation in a reactor.

In some embodiments, the method further comprises collecting the residual sludge after the wet oxidation. In some embodiments, the method further comprises collecting the residual sludge from the wet oxidation reactor.

In some embodiments, the method further comprises separating the solids and liquids from the residual sludge. In some embodiments, the method further comprises separating the residual sludge into a substantially solid component and a liquid component.

In some embodiments, the method further comprises separating the residual sludge into a substantially water soluble component and a substantially water insoluble component.

In some embodiments, the method further comprises separating the solids and liquids from the residual sludge, wherein the solids comprise insoluble components comprising calcium and phosphate. In some embodiments, the method further comprises separating the residual sludge into a substantially solid component and a liquid component, wherein the substantially solid component comprises insoluble components comprising calcium and phosphate. In some embodiments, the method further comprises separating the solids and liquids from the residual sludge, wherein the solids comprise insoluble components comprising calcium and phosphate, and the liquids comprise suspended and/or soluble aluminium. In some embodiments, the method further comprises separating the residual sludge into a substantially solid component and a liquid component, wherein the substantially solid component comprises insoluble components comprising calcium and phosphate, and the liquid component comprises suspended and/or soluble aluminium.

In some embodiments, the method further comprises separating the residual sludge into a substantially water soluble component and a substantially water insoluble component, wherein the substantially water insoluble component comprises insoluble components comprising calcium and phosphate, and the substantially water soluble component comprises suspended and/or soluble aluminium.

In some embodiments, the present invention provides a method for treating a sludge, the method comprising:
(a) adding calcium ions to a phosphate-containing sludge;
(b) if the pH of the sludge with added calcium ions is less than about 8, adjusting the pH of the sludge to at least about 8;
(c) subjecting the sludge with added calcium ions and a pH of at least about 8 to wet oxidation in a reactor such that the residual sludge after wet oxidation has a pH of at least about 8; and
(d) separating the residual sludge into a substantially solid component and a liquid component, wherein the substantially solid component comprises insoluble components comprising calcium and phosphate.

In some embodiments, the present invention provides a method for treating a sludge, the method comprising:
(a) adding calcium ions to a phosphate-containing and aluminium-containing sludge;
(b) if the pH of the sludge with added calcium ions is less than about 8, adjusting the pH of the sludge to at least about 8; and
(c) subjecting the sludge with added calcium ions and a pH of at least about 8 to wet oxidation in a reactor such that the residual sludge after wet oxidation has a pH of at least about 8; and
(d) separating the residual sludge into a substantially solid component and a liquid component, wherein the substantially solid component comprises insoluble components comprising calcium and phosphate, and the liquid component comprises suspended and/or soluble aluminium.

In some embodiments, the present invention provides a method for treating a sludge, the method comprising subjecting a phosphate-containing and calcium-containing sludge to wet oxidation in a reactor such that the residual sludge after wet oxidation has a pH of at least about 8, and separating the residual sludge into a substantially solid component and a liquid component, wherein the substantially solid component comprises insoluble components comprising calcium and phosphate.

In some embodiments, the present invention provides a method for treating a sludge, the method comprising subjecting a phosphate-containing, calcium-containing, and aluminium-containing sludge to wet oxidation in a reactor such that the residual sludge after wet oxidation has a pH of at least about 8, and separating the residual sludge into a substantially solid component and a liquid component, wherein the substantially solid component comprises insoluble components comprising calcium and phosphate, and the liquid component comprises suspended and/or soluble aluminium.

Calcium ions may be added to the sludge by adding a calcium compound as a solid, suspension, slurry or solution. In some embodiments, the calcium compound is readily soluble in the sludge.

The calcium compound is selected such that it is more soluble in the sludge that the insoluble components comprising calcium and phosphate. In some embodiments the calcium compound is selected from calcium chloride ($CaCl_2$), calcium oxide (CaO, lime), calcium hydroxide ($Ca(OH)_2$, slaked lime), and mixtures of any two or more thereof. In some embodiments, the calcium compound is selected from calcium oxide, calcium hydroxide, and mixtures thereof. In some embodiments, the calcium compound is calcium hydroxide.

Typically, sufficient calcium ions are added to the sludge such that substantially all of the phosphate in the sludge forms insoluble components comprising calcium and phosphate. The amount of calcium ions to be added can, therefore, be determined based on the phosphate content of the sludge. In some embodiments, the amount of calcium ions is selected such that excess calcium ions remain in solution. Adding excess calcium ions drives the precipitation reaction, which results in the formation of insoluble components comprising calcium and phosphate, to completion.

In some embodiments, the mole ratio of calcium:phosphate is at least about 3:2. In some embodiments, the mole ratio of calcium:phosphate is at least about 5:1. In some embodiments, the mole ratio of calcium:phosphate is at least about 8:1. In some embodiments, the mole ratio of calcium:phosphate is between about 5:1 and about 20:1. In some embodiments, the mole ratio of calcium:phosphate is between about 8:1 and about 17:1.

The invention is not limited to embodiments in which calcium ions are added to the sludge and also contemplates embodiments in which the sludge contains calcium ions or in which the phosphate is present as insoluble components comprising calcium and phosphate.

In some embodiments, the pH of the sludge following addition of the calcium ions is at least about 8, and no further pH adjustment of the sludge is required.

However, if the pH is less than about 8, the pH is adjusted so that the pH of the sludge is at least about 8. In some preferred embodiments, the pH is at least about 9. In some embodiments, the pH is at least about 10. In some embodiments, the pH is at least about 11. In some embodiments, the pH is at least about 12. In some embodiments, the pH is at least about 12.5. In some embodiments, the pH is at least about 13. In some embodiments, the pH is about 14.

At a pH of at least about 8, the components of the sludge comprising calcium and phosphate are substantially insoluble. In addition, as the pH increases a greater proportion of the aluminium in the sludge, if present, is substantially dissolved. In some embodiments, at a pH of at least about 12, greater than 80% of the aluminium in the sludge will substantially be in solution.

In some embodiments, the pH of the sludge is adjusted so that the pH of the residual sludge after wet oxidation is at least about 8. In some preferred embodiments, the pH is at least about 9. In some embodiments, the pH is at least about 10. In some embodiments, the pH is at least about 11. In some embodiments, the pH is at least about 12. In some embodiments, the pH is at least about 12.5. In some embodiments, the pH is at least about 13. In some embodiments, the pH is about 14.

The pH is typically adjusted with a strong base such as sodium hydroxide (NaOH, caustic soda) or potassium hydroxide (KOH). The invention is not limited thereto and other bases, such as magnesium hydroxide ($Mg(OH)_2$), lithium hydroxide (LiOH), and calcium hydroxide may be used. Mixtures of two or more bases may also be used.

In some embodiments, the pH is adjusted with sodium hydroxide.

In those embodiments wherein calcium ions are added to the sludge and the pH is adjusted simultaneously, the calcium ions may be added and the pH adjusted by adding a basic calcium compound, such as calcium oxide and/or calcium hydroxide. Alternatively, the calcium ions may be added and the pH adjusted by adding a mixture of a calcium compound and a base, such as sodium hydroxide. Alternatively, the calcium ions may be added and the pH adjusted by adding a mixture of calcium oxide and/or calcium hydroxide and another base, such as sodium hydroxide.

The pH may be adjusted by, for example, adding a base as a solid, suspension, slurry, or solution. In some embodiments, the base is added as an aqueous solution.

In those embodiments wherein the sludge comprises aluminium and phosphate, at a pH of at least about 8 the added calcium ions react with the phosphate to form insoluble components comprising calcium and phosphate, such as calcium phosphate, and the aluminium forms suspended and/or soluble aluminium, such as tetrahydroxidoaluminate.

The sludge is subjected to wet oxidation. The wet oxidation decomposes the organic material in the sludge to leave a substantially non-volatile residual sludge, which comprises insoluble components comprising calcium and phosphate and, in some embodiments, suspended and/or soluble aluminium. Advantageously, the suspended and/or soluble aluminium can then be readily separated from the insoluble components comprising calcium and phosphate.

Wet oxidation is an effective method for lowering the chemical oxygen demand of many waste materials. Wet oxidation typically involves the oxidation of predominantly organic compounds at elevated temperatures and pressures in an aqueous or semi-aqueous phase. Temperatures of 127-320° C. and pressures of 0.5-20 MPa are generally employed. A catalyst may be employed to increase the rate of the oxidation reaction.

In some embodiments, the wet oxidation utilises the process described in WO 2004/000423 (which is incorporated herein in its entirety by reference).

Advantageously, the process described in WO 2004/000423 can be operated by continuously introducing a feedstock into a reactor, oxidising the feedstock to produce a vapour phase comprising at least some oxidation products and a liquid phase, and removing at least some of the vapour phase from the reactor while retaining the liquid phase in the reactor.

The present invention is not, however, limited to this wet oxidation process and other wet oxidation processes as are known in the art may be used.

In the wet oxidation, the sludge is contacted with an oxidant. The term "contact" as used herein generally means admixing the sludge with the oxidant in a suitable reactor, which is of a type designed to withstand the temperature and pressure and is well known in the art. Suitable reactors include, but are not limited to autoclaves and pressure reactors.

In some embodiments, the reactor is one in which the interfacial area between the oxidant and the sludge is maximised, and from which the volatile products (for example, steam, carbon dioxide, and volatile organic compounds, such as various organic acids) formed upon oxidation of the organic material in the sludge and the volatile non-oxidisable components (for example, water) present in the sludge may be readily removed from the reactor in the vapour phase.

The sludge may be introduced into the wet oxidation reactor by means of a suitable high pressure pump or by other means as are known in the art, such as an extruder, or a screw-thread type or diaphragm pump. The residence time in the reactor and, consequently, the degree of oxidation of the organic components of the sludge, is proportional to the rate at which the sludge is introduced into the wet oxidation reactor.

In some embodiments, wherein the wet oxidation is performed in a semi-continuous or continuous manner, the sludge is introduced into the wet oxidation reactor at a substantially constant rate. The invention is not limited thereto, and embodiments in which the wet oxidation is performed in a batchwise manner are also contemplated.

The reactor residence time is typically selected based on, for example, the components of the sludge and the desired reduction in COD. In some embodiments, the reactor residence time is between about 30-100 minutes. In some embodiments, the reactor residence time is about 60 minutes.

The temperature and pressure at which the wet oxidation is performed can be selected by a person skilled in the art, depending on the composition of the sludge and the wet oxidation reactor. The temperature at which the wet oxidation is performed is generally between about 200° C. and 320° C. and the pressure is generally between about 4 MPa and about 10 MPa.

In some embodiments, the temperature at which the wet oxidation is performed is between about 200° C. and about 300° C. In some embodiments, the temperature is between about 240° C. and about 300° C. In some embodiments, the temperature is between about 240° C. and about 290° C. In some embodiments, the temperature is between about 250° C. and about 280° C.

Advantageously, the solubility of calcium phosphate decreases with elevated temperature. Accordingly, in those embodiments wherein the sludge comprises aluminium phosphate, the reaction of calcium ions with aluminium phosphate to form insoluble components comprising calcium and phosphate, and suspended and/or soluble aluminium, proceeds further at higher temperatures.

In some embodiments, the pressure at which the wet oxidation is performed is between about 4 MPa and about 8 MPa. In some embodiments, the pressure is between about 5.5 MPa and about 8 MPa.

Suitable catalysts are known in the art and include, but are not limited to, the transition metal ions and mixtures thereof. In some embodiments, the catalyst is ruthenium ions, bismuth ions, cobalt ions, copper ions, iron ions, manganese ions, or a mixture thereof. In some embodiments, the catalyst is bismuth ions, cobalt ions, copper ions, iron ions, manganese ions, or a mixture thereof. In some embodiments, the catalyst is bismuth ions, cobalt ions, copper ions, iron ions, or a mixture thereof.

In some embodiments, the catalyst is a homogeneous catalyst and, in other embodiments, a heterogeneous catalyst. The invention contemplates embodiments wherein the catalyst is supported on a suitable mesh in the wet oxidation reactor.

Oxidants that may be used in the wet oxidation include, but are not limited to air, ozone, oxygen, and hydrogen peroxide. In some embodiments, the oxidant is air or oxygen. In some preferred embodiments, the oxidant is air. Accordingly, in some embodiments, the sludge is subjected to wet air oxidation.

The oxidant is typically introduced into the wet oxidation reactor at an equivalent or greater pressure to that of the reactor and at a rate sufficient to effect oxidation of the organic material in the sludge. The amount of oxidant is typically selected based on the initial COD of the sludge.

In some embodiments, wherein the oxidant is a compressed gas, the compressed gas is introduced into the wet oxidation reactor using means as are known in the art. In some embodiments, the compressed gas is introduced through a suitable pressure gauge.

Wet oxidation apparatus typically includes a heating means for heating the sludge to the temperature at which the wet oxidation is performed.

In some embodiments, the wet oxidation is exothermic. Accordingly, in some embodiments, the wet oxidation apparatus incorporates a cooling means to maintain the temperature at which the wet oxidation is performed. In some embodiments, the cooling means incorporates a heat exchanger that may be used to heat the incoming sludge.

The volatile oxidation products in the vapour phase may be removed from the wet oxidation reactor using means as are known in the art. In some embodiments, the vapour phase is removed through a trumpet valve, needle valve, or similar in the wet oxidation reactor.

The volatile oxidation products in the vapour phase removed from the wet oxidation reactor may be recovered by reducing the temperature and pressure of the vapour phase. Typical oxidation products include, but are not limited to, water, carbon dioxide, formic acid, acetic acid, higher organic acids, and mixtures thereof. Carbon dioxide and other gases may, for example, be vented to the atmosphere or otherwise separated from the condensate.

The wet oxidation apparatus may incorporate a mixing means for mixing the reactor contents. Suitable mixing means include, but are not limited to, stirring, air lift mixing, ultrasound, shaking, and rotating.

In some embodiments, the pH of the reactor contents are monitored and, if necessary, adjusted during the wet oxidation such that the pH is maintained at at least about 8 during the wet oxidation.

Generally, the pH of the sludge before the wet oxidation is adjusted so that the pH of the residual sludge is at least about 8. Accordingly, in some embodiments, the wet oxidation comprises subjecting the sludge to wet oxidation such that the residual sludge after wet oxidation has a pH of at least about 8, preferably at least about 9.

Advantageously, adjusting the pH of the sludge before the wet oxidation and, if necessary, maintaining the pH at an alkaline pH during the wet oxidation reduces the corrosion of the wet oxidation reactor and associated equipment that may otherwise occur due to the formation of acidic components, such as various organic acids, during the wet oxidation.

The substantially non-volatile residual sludge may be collected from the wet oxidation reactor. In those embodiments wherein the wet oxidation is performed in a semi-continuous or continuous manner, the residual sludge (or "blow-down") may be periodically collected from the reactor by expelling the residual sludge from the reactor under pressure.

The liquid level in the wet oxidation reactor is typically monitored during the wet oxidation. The liquid level in the wet oxidation reactor may be maintained below a pre-selected upper limit by periodically collecting the residual sludge from the reactor.

FIG. 1 shows one embodiment of an apparatus suitable for performing the method of the invention. The invention is not limited thereto and other suitable apparatus will be apparent to those persons skilled in the art. The apparatus (1) includes a sludge preparation tank (3), in which, for example, the calcium ions may be added to the sludge and the pH adjusted. The sludge is pumped by pump (5) through a heat exchanger (7) into a wet oxidation reactor (9). The sludge is pre-heated by the vapour phase (11), which typically comprises steam, carbon dioxide and volatile organic compounds, such as various organic acids, exiting the reactor (9). An oxidant (13), such as air is also fed into the reactor (9). Periodically, the residual sludge (15) is removed from the wet oxidation reactor (9) during blow-down.

The pH of the residual sludge is preferably at least about 8. In some embodiments, the pH of the residual sludge is adjusted and maintained at at least about 8. In some embodiments, the pH of the residual sludge is adjusted and maintained at at least about 9. In some embodiments, the pH of the residual sludge is adjusted and maintained at at least about 10. In some embodiments, the pH of the residual sludge is adjusted and maintained at at least about 11. In some embodiments, the pH of the residual sludge is adjusted and maintained at at least about 12. In some embodiments, the pH of the residual sludge is adjusted and maintained at at least about 13. In some embodiments, the pH of the residual sludge is adjusted and maintained at about 14. In some embodiments, the pH of the residual sludge is adjusted and maintained at a pH between about 8 and about 12. In some embodiments, the pH of the residual sludge is adjusted to about 12.

The invention also contemplates embodiments in which the pH of the residual sludge is decreased. In those embodiments, the pH is decreased by adding a suitable acid, such as sulfuric acid ($H_2SO_4$), nitric acid ($HNO_3$), or hydrochloric acid (HCl). The invention is not limited thereto and other acids may be used.

The residual sludge comprises insoluble components comprising calcium and phosphate and, in some embodiments, also comprises suspended and/or soluble aluminium. The residual sludge may also comprise other insoluble minerals and metal salts, depending on the composition of the sludge.

The residual sludge is typically cooled before further processing. In some embodiments, the residual sludge is cooled using a heat exchanger, which may also heat the incoming sludge.

The substantially solid component of the residual sludge, which comprises insoluble components comprising calcium and phosphate, may be separated from the liquid component of the residual sludge by, for example, filtering the residual sludge. In some embodiments, the substantially solid component is separated from the liquid component by vacuum filtration. Other methods of separating the substantially solid component of the residual sludge from the liquid component may also be used, such as a phase separator, a hydrocyclone, extractor, or centrifuge. In some embodiments, the substantially solid component may be separated from the liquid component by gravity settlement.

In some embodiments, the catalyst, if used, is separated and recovered from the residual sludge.

The substantially solid component of the residual sludge, which comprises insoluble components comprising calcium and phosphate, may be used, for example, as a fertiliser, soil conditioner, or concrete additive. Other uses will be apparent to those skilled in the art. The substantially solid component may be further processed.

In those embodiments wherein the sludge comprises aluminium, the liquid component of the residual sludge comprises suspended and/or soluble aluminium.

In some embodiments, the liquid component of the residual sludge, which comprises suspended and/or soluble aluminium, is suitable for use without further treatment as a coagulant in water and wastewater treatment. Other uses will be apparent to those skilled in the art. The liquid component may be further processed. In some embodiments, the liquid component is neutralised to produce aluminium hydroxide, which may then be treated with sulfuric acid to a pH of about 4 or less to form aluminium sulfate.

In some embodiments, the present invention provides a method for treating a sludge, the method comprising:
(a) adding calcium ions to a phosphate-containing sludge;
(b) if the pH of the sludge with added calcium ions is less than about 8, adjusting the pH of the sludge to at least about 8;
(c) subjecting the sludge with added calcium ions and a pH of at least about 8 to wet air oxidation in a reactor such that the residual sludge after wet oxidation has a pH of at least about 8; and
(d) separating the residual sludge into a substantially solid component and a liquid component, wherein the substantially solid component comprises insoluble components comprising calcium and phosphate.

In some embodiments, the present invention provides a method for treating a sludge, the method comprising:
(a) adding calcium ions to a phosphate-containing and aluminium-containing sludge;
(b) if the pH of the sludge with added calcium ions is less than about 8, adjusting the pH of the sludge to at least about 8; and
(c) subjecting the sludge with added calcium ions and a pH of at least about 8 to wet air oxidation in a reactor such that the residual sludge after wet oxidation has a pH of at least about 8; and
(d) separating the residual sludge into a substantially solid component and a liquid component, wherein the substantially solid component comprises insoluble components comprising calcium and phosphate, and the liquid component comprises suspended and/or soluble aluminium.

In some embodiments, the present invention provides a method for treating a sludge, the method comprising subjecting a phosphate-containing and calcium-containing sludge to wet air oxidation in a reactor such that the residual sludge after wet air oxidation has a pH of at least about 8, and separating the residual sludge into a substantially solid component and a liquid component, wherein the substantially solid component comprises insoluble components comprising calcium and phosphate.

In some embodiments, the present invention provides a method for treating a sludge, the method comprising subjecting a phosphate-containing, calcium-containing, and aluminium-containing sludge to wet air oxidation in a reactor such that the residual sludge after wet air oxidation has a pH of at least about 8, and separating the residual sludge into a substantially solid component and a liquid component, wherein the substantially solid component comprises insoluble components comprising calcium and phosphate, and the liquid component comprises suspended and/or soluble aluminium.

The invention may also be said broadly to consist in the parts, elements and features referred to or indicated in the specification of the application, individually or collectively, in any or all combinations of two or more of said parts, elements or features, and where specific integers are mentioned herein which have known equivalents in the art to which the invention relates, such known equivalents are deemed to be incorporated herein as if individually set forth.

The following non-limiting examples are provided to illustrate the present invention and in no way limit the scope thereof.

EXAMPLES

Apparatus

Figure 2:
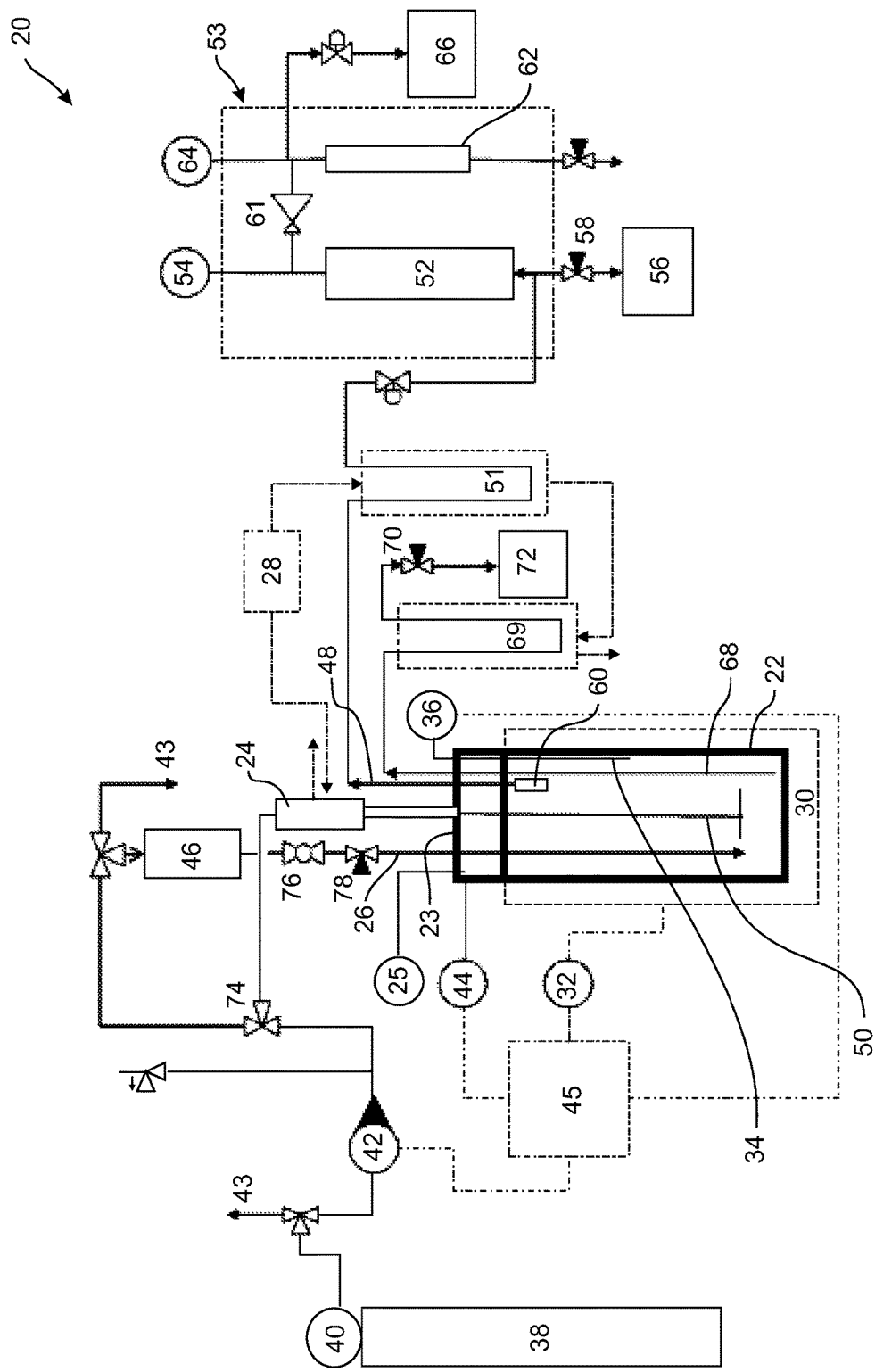
FIG. 2 is a schematic diagram of another embodiment of an apparatus suitable for use in a method of the invention.

The following experiments were performed in an apparatus, which could be operated in batch or continuous mode. The apparatus (20) is illustrated in FIG. 2 set up for continuous operation.

The apparatus (20) included a stainless steel autoclave reaction vessel (22) (300 ml), the lid (23) of which was fitted with a stirrer (24) (MagneDrive II), a blow disc (25) and an inlet connection for the feed line (26). For use at high temperature, the bearings on the drive shaft of the stirrer (24) required cooling, so a mains water cooler (28) was attached.

The reaction vessel (22) was heated via an external element (30) (2 kW) with accurate heat control via a temperature controller (32), and an additional thermocouple probe (34) connected to a temperature indicator (36) was inserted into the reaction vessel (22) and was in contact with the liquid phase.

Compressed air was supplied from a cylinder (38) (BOC; dry air, 20 MPa), fitted with a high pressure outlet regulator (40) capable of supplying air at or above the operating pressure. The air flow was further controlled by a metering valve (not shown) built in to the air flow meter (42) (Swagelok, rotameter, M2 type). The air supply also included two line vents (43).

The reaction vessel (22) was fitted with a pressure transmitter (44) that, together with the temperature controller (32), temperature indicator (36) and flow meter (42), was connected to a control unit (45).

The apparatus (20) included a removable pressure stainless steel vessel (46) (150 mL), mounted on the reaction vessel lid (23) for use as a raw material feed vessel (feed tank). This vessel (46) acted as a reservoir, through which the compressed air inlet was diverted to transfer sludge to the reaction vessel (22) with positive pressure in a single slug (up to 150 mL). Alternatively, a screw-thread type or diaphragm pump could be used.

A feed line (26) entered the reaction vessel lid (23) and exited through a ⅛" tube (48) positioned with the outlet vertically adjacent to the stirrer rotor (50) for maximum distribution effect.

The vapour outlet of the reaction vessel (22) exited through the lid of the reaction vessel (23), and entered a condenser loop (51) cooled by a water jacket. The flow continued to a condenser collection vessel (52), maintained at the same operating pressure as the reaction vessel (22). The condenser vessel (52) was placed in a bath (53), which could be cooled by water or glycol as desired. The collection vessel (52) allowed visual inspection of the condensed fluid, pressure monitoring via a pressure transmitter (54), and allowed collection of the liquid (56) via a hand operated valve (58) capable of being opened and closed under the operating pressure.

Within the reaction vessel (22), the outlet port was modified to guard against potential foaming of the reaction mixture. A tube was inserted, with an anti-foam attachment (60)—a steel mesh containing anti-bumping granules.

The vapour outlet on top of the collection vessel (52) was connected to a spring-loaded pressure regulation valve (or back pressure regulator (BPR, 61)). When in batch mode, this valve (61) could be open or closed throughout the reaction (thus controlling air flow). In continuous mode, this valve (61) controlled the pressure of the system allowing continuous flow of vapours. The vapour passed into a secondary condenser collection vessel (62). The secondary condenser vessel (62) was placed in the bath (53). A pressure indicator (64) was connected to the secondary condenser vessel (62). The outlet from the secondary condenser vessel (62) could be bubbled through a vapour trap (66) (for example, a suitable aqueous solution) or diverted to collect the vapours (for example, in a suitable sampling bag, such as a TEDLAR® bag (not shown)) for analysis.

A siphon tube (68) was fitted to the reaction vessel (22) interior, with the port as close to the floor of the reaction vessel (22) as possible, connected to an external water cooled heat exchanger (69) with a needle valve (70) to control flow. Residual sludge (or blow-down (72)) could then be removed directly from the reaction vessel (22) interior when at full operational conditions, notably at the end of the reaction.

In operation, the raw material feed vessel (46) was manually filled with sludge and then securely connected in an upright position to the reaction vessel lid (23) when required. When the feed vessel (46) was not in position, a safety pipe assembly (safety loop, not shown) was fitted to guard against any accidental or undesired release of sludge. A simple valve sequence allowed transfer of sludge to the reaction vessel (22), whereby the air inlet flow was diverted via a 3-way air inlet valve (74) through the feed vessel (46) to push the sludge through using positive pressure.

Normal flow could be restored by returning the valve positions, and the raw material feed vessel (46) could then be safely vented, removed and replaced with the safety loop. The raw material feed vessel (46) could then be weighed and filled with sludge for next usage as required. This system could also be used to deliver water as a cleaning purge between batches of sludge. Advantageously, the apparatus (20) permitted sludge to be delivered into the reaction vessel (22) when at operating pressure and temperature, multiple times, allowed continuous operation and avoided the need to open the reaction vessel (22) (including cooling time) between runs.

Sludge

Municipal waste sludge was received from the wastewater treatment works at Palmerston North. Raw sludge was collected from the clarifier discharge to feed the centrifuge before dewatering chemical. Table 1 lists the typical properties of the raw sludge before addition of calcium ions and pH adjustment.

TABLE 1

| Solid Content | 1.0-4.5% |
| --- | --- |
| Laminar Viscosity | 0.78-2.71 Pa · s |
| Density | 1.1 kg/L |
| COD | Max. 60 g/L |

| Element | Approx Mol % |
| --- | --- |
| C | 25 |
| H | 49 |
| O | 24 |
| Al | 1 |
| P | 1 |

General Operating Procedure

Table 2 shows typical operating conditions for the apparatus (20).

TABLE 2

| Feed | 100 g per hour |
| --- | --- |
| Temperature | 240-290° C. |
| Pressure | 4-8 MPa |
| Air flow | 0-150 g per hour |

The reaction vessel (22) (300 ml) was sealed and all parts of the lid (23) assembly were checked, with the lid (23) bolts torqued (40 lb).

The air inlet line was connected and the feed inlet safety loop was placed in position with all valve positions checked. A leak test was performed by pressurising the reaction vessel (22) to 5 MPa at room temperature and isolating the reaction vessel (22). Once complete, the reaction vessel (22) was vented and the air inlet disconnected.

The thermocouple (34) and lid insulation (not shown) were fitted, the stirrer belt and shields (not shown) placed in position, and the stirrer (24) tested. The air inlet line was reconnected, and the cooling water lines connected to the stirrer (24) head.

The heater (30) was switched on to the appropriate setpoint (for example, 280° C. for internal temperature of 250° C.). The temperature rise was closely monitored throughout the heating cycle.

Stirring was commenced and air introduced into the reaction vessel (22) from the cylinder (38). The BPR (61) was opened to modulate the pressure and the air inlet valve (74) remained open to allow a constant stream of air into the system. The metering valve on the flow meter (42) controlled the flow.

While the reaction vessel (22) was heating to the operating temperature, the sludge was prepared by adding the required amount of sodium hydroxide (5.5 M, 5.00 mL) and calcium oxide CaO (0.70 g) (or equivalent) to the raw sludge (c.a. 100 g) with stirring until it was well mixed. The pH of the sludge was then about 12. This sludge was then charged to the raw material feed vessel (46), which was then carefully sealed and positioned on the reaction vessel lid (23) following removal of the safety loop.

Once the operating temperature was reached, the sludge was transferred into the reaction vessel (22) by switching the 3-way air inlet valve (74) to the raw material feed vessel (46) allowing it to pressurise, then carefully opening the raw material feed vessel outlet valve (76) and the reaction vessel inlet needle valve (78) to allow the sludge to flow into the reaction vessel (22) in a single continuous slug. The BPR (61) could be opened a little further to create a bigger pressure differential and allow a higher flow rate.

The flow increased notably at this stage and the reaction vessel (22) temperature dropped significantly upon introduction of the sludge (c.a. 50° C.). After approximately 3 minutes, normal flow was restored, including returning the BPR (61) to its normal position to maintain pressure and flow in the apparatus (20).

The reaction vessel feed inlet valve (78) was closed and the raw material feed vessel (46) was carefully vented from the apparatus (20) and replaced with the safety loop. The reaction vessel (22) temperature was soon restored.

The reaction was allowed to proceed at the selected operating conditions and the system parameters were recorded throughout the reaction at 10 minute intervals, including the liquid level in the condenser tank (52).

Liquid fractions were periodically collected, depending upon the fill level, via the drain valve (58) on the condenser tank (52).

To simulate continuous operation, the above method was repeated with introduction of sludge, for example 20 g every 12 minutes, equating to 100 g/hour. The temperature drop for each of these additions was observed to be much lower (5-10° C.).

The reaction was ended by switching off the heater (30) and stirrer (74).

The residual sludge (72) was collected, when required, from the reaction vessel (22) interior via the blow-down valve (70).

Results

COD Reduction

Figure 3:
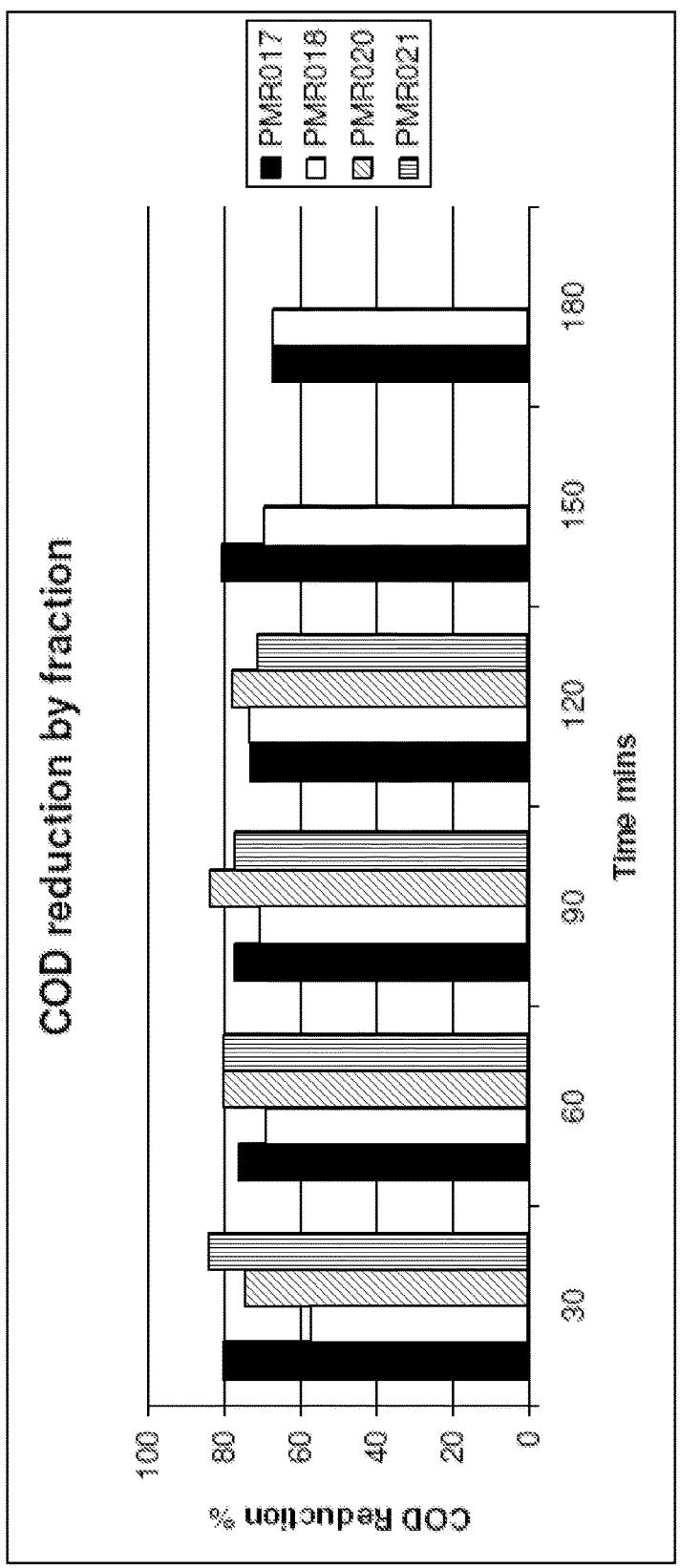
FIG. 3 shows the reduction in COD during a method of the invention.

The reduction in COD varied with the operating conditions employed. Table 3 shows the operating conditions used for four experiments and FIG. 3 shows the reduction in COD achieved under each of those operating conditions.

TABLE 3

| | Temp ° C. | Air pressure MPa | Feed rate g/hr | COD Rdn % | COD Rdn % of theoretical |
| --- | --- | --- | --- | --- | --- |
| PMR017 | 260 | 6.0 | 100 | 79 | 88 |
| PMR018 | 260 | 6.0 | 40 | 54 | 60 |
| PMR020 | 260 | 6.0 | 150 | 71 | 79 |
| PMR021 | 275 | 7.5 | 70 | 73 | 81 |

Recovered Phosphate

A phosphate mass balance (Table 4) showed over 99% of the phosphate remained in the residual sludge (72) collected from the reaction vessel (22) interior.

TABLE 4

| | Measured P (mg/L) as $PO_4$ |
| --- | --- |
| Sludge | 724.32* |
| Condensate | 1.64 |
| Blow-down | 722.69** |

*Compares favourably with the theoretical predicted concentration of 1000 mg/L based on average influent phosphate concentration and sludge production
**By calculation Recovered Aluminium The residual sludge (72) collected from the reaction vessel (22) interior was treated to provide a recovered aluminium solution. It was estimated that at least 80% of the available aluminium was recovered from the raw sludge in the recovered aluminium solution. The recovered aluminium solution was compared in jar tests (coagulation tests) on a sample of influent against a standard solution of aluminium sulfate (Merck). Using a flocculation apparatus with a program of stirring at 50 rpm for 10 min, 30 rpm for 30 min and finally settling for one hour, flocculation, turbidity and clarity were evaluated by visual inspection and the residual phosphate level was measured.

The general procedure to determine the performance of the recovered aluminium solution was:

$Ca(OH)_2$ (1.5 g) and NaOH (10 mL of 6M, 2.4 g) were added to 300 g of raw sludge from the wastewater treatment works, which contained approximately 5 g of hydrated aluminium sulfate (alum).

The sludge was subjected to wet air oxidation as described above in a batch process.

The residual sludge (72) collected from the reaction vessel (22) interior was allowed to cool and then filtered under vacuum using glass fibre (Whatman GFC) filter papers.

The filtrate, which was at approximately pH 12, was analysed. Phosphate was not detected. Aluminium was determined to be equivalent to 3.5-4.0 g of aluminium sulfate—approximately 80% recovery of the aluminium in the raw sludge.

In order to provide a direct comparison with the commercially available aluminium sulfate, the filtrate solution was neutralised with sulfuric acid (approximately 7 mL of 6M) and a precipitate formed. The resulting solid was filtered and washed before re-dissolving with sulfuric acid to pH 3.5 and diluted to 300 mL to provide the recovered aluminium solution.

The performance of the recovered aluminium solution was then compared directly with commercially available aluminium sulfate using standard coagulation tests. The performance of the recovered aluminium solution is summarised in Table 5 and the recovered aluminium solution showed similar performance to commercially available aluminium sulfate.

TABLE 5

| Dose (mL) | pH | [$PO_4^{3-}$] ppm | Turbidity | Clarity | Flocculation |
|---|---|---|---|---|---|
| 10 | 7.0 | n/a | high | poor | yes |
| 15 | 6.9 | 0.85 | low | poor | yes |
| 20 | 6.8 | 0.31 | low | good | yes |
| 30 | 6.6 | 0.31 | low | good | yes |
| 40 | 6.4 | n/a | low | good | yes |

INDUSTRIAL APPLICATION

It will be appreciated that, in use, the present invention provides a method for recovering phosphate as a substantially solid component, which comprises insoluble components comprising calcium and phosphate, from a phosphate-containing sludge. Advantageously, the method incorporates wet oxidation to decompose the organic components of the sludge to provide a residual sludge comprising insoluble components comprising calcium and phosphate and, in some embodiments, suspended and/or soluble aluminium.

The substantially solid component of the residual sludge, which comprises insoluble components comprising calcium and phosphate, may be suitable for use as a fertiliser, for example. The suspended and/or soluble aluminium may be suitable for use as a coagulant in water and wastewater treatment.

It is not the intention to limit the scope of the invention to the abovementioned examples only. As would be appreciated by a skilled person in the art, many variations are possible without departing from the scope of the invention as set out in the accompanying claims.

In addition, where features or aspects of the invention are described in terms of a Markush group, those skilled in the art will recognise that the invention is also thereby described in terms of any individual member or subgroup of members of the Markush group.

REFERENCES

"Phosphorus removal in low alkalinity secondary effluent using alum" R. J. Banu; K. U. Do; I. T. Yeom Int. J. Environ. Sci. Tech. 5 (1), 93-98, 2008

WO 2004/000423

The invention claimed is:

1. A method for treating a sludge, wherein the sludge is obtained from treatment of water or waste water with an aluminium compound that reacts with phosphate to form a precipitate, wherein the sludge contains calcium and wherein the method comprises subjecting the phosphate-containing, calcium-containing, and aluminium-containing sludge to wet oxidation at a pressure of less than about 10 MPa such that the pH of the residual sludge obtained after wet oxidation is at least about 8.

2. A method as claimed in claim 1, wherein the phosphate-containing, calcium-containing, and aluminium-containing sludge is a phosphate-containing and aluminium-containing sludge comprising added calcium ions.

3. A method as claimed in claim 2, wherein the calcium ions are added to the sludge by adding a calcium compound as a solid, suspension, slurry, or solution.

4. A method as claimed in claim 2, wherein sufficient calcium ions are added to the sludge such that substantially all of the phosphate in the sludge forms insoluble components comprising calcium and phosphate.

5. A method as claimed in claim 2, wherein the amount of calcium ions added to the sludge is selected such that excess calcium ions remain in solution.

6. A method as claimed in claim 2, wherein the pH of the sludge following addition of the calcium ions is at least about 8.

7. A method as claimed in claim 1, wherein the residual sludge comprises insoluble components comprising calcium and phosphate.

8. A method as claimed in claim 1, wherein the residual sludge comprises suspended and/or soluble aluminium.

9. A method as claimed in claim 1, further comprising adjusting the pH of the sludge.

10. A method as claimed in claim 9, wherein the pH is adjusted during wet oxidation.

11. A method as claimed in claim 9, wherein the pH is adjusted so that the pH of the residual sludge is at least about 9, at least about 10, at least about 11, at least about 12, at least about 12.5, at least about 13, or about 14.

12. A method as claimed in claim 9, wherein the pH is adjusted by adding a base as a solid, suspension, slurry, or solution.

13. A method as claimed in claim 1, wherein the wet oxidation is wet air oxidation.

14. A method as claimed in claim 1, further comprising separating the residual sludge into a substantially solid component and a liquid component.

15. A method as claimed in claim 1, further comprising separating the residual sludge into a substantially water soluble component and a substantially water insoluble component.

16. A method as claimed in claim 1, further comprising separating the residual sludge into a substantially solid component and a liquid component, wherein the liquid component comprises suspended and/or soluble aluminium.

17. A method as claimed in claim 1, further comprising separating the residual sludge into a substantially water soluble component and a substantially water insoluble component, wherein the substantially water soluble component comprises suspended and/or soluble aluminium.

18. The method of claim 1, wherein the wet oxidation is performed at a temperature of between about 200° C. and about 320° C. and a pressure of greater than about 4 MPa.

19. A method for treating a sludge, wherein the sludge is obtained from treatment of water or waste water with an aluminium compound that reacts with phosphate to form a precipitate and wherein the method comprises:
  (a) adding calcium ions to the phosphate-containing and aluminium-containing sludge;
  (b) if the pH of the sludge is less than about 8, adjusting the pH of the sludge to at least about 8; and
  (c) subjecting the sludge with added calcium ions and a pH of at least about 8 to wet oxidation at a pressure of not more than about 10 MPa.

20. The method of claim 19, wherein the wet oxidation is performed at a temperature of between about 200° C. and about 320° C. and a pressure of greater than about 4 MPa.

21. A method for treating a sludge, wherein the sludge is obtained from treatment of water or waste water with an aluminium compound that reacts with phosphate to form a precipitate and wherein the method comprises:
  (a) adding calcium ions to the phosphate-containing and aluminium-containing sludge;
  (b) if the pH of the sludge with added calcium ions is less than about 8, adjusting the pH of the sludge with added calcium ions to at least about 8;
  (c) subjecting the sludge with added calcium ions and a pH of at least about 8 to wet oxidation in a reactor at a pressure of not more than about 10 MPa such that the residual sludge after wet oxidation has a pH of at least about 8; and
  (d) separating the residual sludge into a substantially solid component and a liquid component, wherein the substantially solid component comprises insoluble components comprising calcium and phosphate and wherein the liquid component comprises suspended and/or soluble aluminium.

22. The method of claim 21, wherein the wet oxidation is performed at a temperature of between about 200° C. and about 320° C. and a pressure of greater than about 4 MPa.

* * * * *